United States Patent [19]

Stanistreet

[11] E Re. 30,955

[45] Reissued Jun. 1, 1982

[54] FIBROUS PRODUCT

[75] Inventor: Harold P. Stanistreet, Harrogate, England

[73] Assignee: Imperial Chemical Industries Limited, London, England

[21] Appl. No.: 39,748

[22] Filed: May 16, 1979

Related U.S. Patent Documents

Reissue of:

[64] Patent No.: 4,068,036
Issued: Jan. 10, 1978
Appl. No.: 673,547
Filed: Apr. 5, 1976

[30] Foreign Application Priority Data

Apr. 11, 1975 [GB] United Kingdom ..... 14962/75

[51] Int. Cl.[3] ..... C09J 5/00

[52] U.S. Cl. ..... 156/308.2; 156/497; 156/498; 156/555; 428/296

[58] Field of Search ..... 428/296; 156/308.2, 156/497, 498, 555

[56] References Cited

U.S. PATENT DOCUMENTS 3,589,956 6/1971 Kranz et al. ..... 428/296
3,595,731 7/1971 Davies et al. ..... 156/306

FOREIGN PATENT DOCUMENTS 1140710 1/1969 United Kingdom .

*Primary Examiner*—James J. Bell
*Attorney, Agent, or Firm*—Cushman, Darby & Cushman

[57] ABSTRACT

A resilient, thermally bonded, non-woven fibrous batt having a uniform compression modulus in one plane which is more than the compression modulus measured in a direction perpendicular to that plane, and a substantially uniform density across its thickness is obtained by preparing a batt comprising at least 20% by weight of crimped and/or crimpable conjugate fibres having or capable of developing a crimp frequency of less than 10 crimps per extended cm. and a decitex in the range of 5 to 30. The batt is thermally bonded by subjecting it to an upward flow of a fluid heated to a temperature sufficient to heat the batt to a temperature in excess of the softening temperature of the low softening component but below the softening temperature(s) of the other component(s) of the conjugate fibre to effect inter-fibre bonding. The thermally bonded batt is then cooled by an upward flow of cool air.

5 Claims, No Drawings

FIBROUS PRODUCT

Matter enclosed in heavy brackets [ ] appears in the original patent but forms no part of this reissue specification; matter printed in italics indicates the additions made by reissue.

The present invention relates to the production of a bonded, non-woven, fibrous batt.

It is known to produce such a batt by compressing an open (e.g. carded) web or batt comprising crimpable and bondable conjugate fibres, and then heating the batt to crimp the conjugate fibres and to effect interfibre bonding. It is also known to produce such a product by initially heating crimpable and bondable conjugate fibres at a temperature sufficient to crimp and stabilise the fibres without effecting interfibre bonding, forming the fibres into an open (e.g. carded) non-woven web or batt, heating the batt to a temperature sufficient to effect inter-fibre bonding, and cooling the batt to form a bonded, integral structure. Moreover, it is also known to form a batt of heat stabilised, crimped conjugate fibres, heating the batt to effect interfibre bonding, and subsequently compressing the batt to the desired density and shape whilst hot.

By the term "fibre" is meant a fibre of staple length of 0.5 to 6 inches, preferably from 1 to 5 inches. The term "conjugate fibre" refers to a fibre composed of at least two fibre-forming polymeric components arranged in distinct zones across the cross-section of the fibre and substantially continuous along the length thereof, and wherein one of the components has a softening temperature significantly lower than the softening temperature(s) of the other components(s) and is located so as to form at least a portion of the peripheral surface of the fibre. Types of conjugate fibres within this definition, for example, include those wherein a component of low melting temperature is (a) one of two components arranged side-by-side, or (b) forms a sheath about another component serving as a core, or (c) forms one or more lobes of a multilobal fibre. Fibres in which the polymeric components are asymmetrically arranged in the cross-section thereof are potentially crimpable in that they tend to develop crimp when subjected to a heat treatment. In contrast, fibres in which the polymeric components are symmetrically arranged do not have a propensity to crimp, and must therefore be crimped by mechanical action, such as, for example, by the stuffer-box method.

In the known processes for producing a bonded non-woven fibrous batt interfibre bonding is effected by passing an unbonded batt of fibres through an oven, especially an oven through which the batt travels on a brattice and hot fluid, for example steam or air, is blown downwards onto the batt. This downward flow of hot air tends to compress the batt and consequently affects the physical properties of the resultant bonded product, in particular the density thereof. The process of the present invention seeks to reduce the degree of compression of the batt during interfibre bonding and to provide bonded non-woven fibrous batts having new characteristics.

Therefore, according to the present invention there is provided a method for the production of a resilient, bonded, non-woven fibrous batt wherein a batt, comprising at least 20% by weight of crimped and/or potentially crimpable conjugate fibres (as hereinbefore defined), is subjected to a heat treatment by the upward passage through the batt of a fluid having a temperature sufficient to heat the batt to a temperature in excess of the softening temperature of the lower softening component but below the softening temperature(s) of the other component(s) to effect inter-fibre bonding, and then causing or permitting the batt to cool. Optionally the hot, bonded fibrous batt may be compressed to a desired shape and/or density before it is cooled. In a preferred process, the thermally bonded batt is cooled by an updraught of cold air to quench the fibres so that they rapidly redevelop their modulus, and any tendency for the batt to collapse is reduced or even eliminated.

The conjugate fibres may have or be capable of developing a crimp frequency in excess of 10 crimps per extended cm. of fibre, but particularly useful products may be obtained from conjugate fibres having or capable of developing a crimp frequency of less than 10 crimps per extended cm., and desirably in the range of 2 to 4 crimps per extended cm.

Preferably the initial, unbonded batt comprises at least 50% by weight of crimped and/or crimpable bondable conjugate fibres, and, desirably, is composed wholly of such fibres. In those circumstances where non-conjugate fibres are present, the non-conjugate fibres are preferably crimped and heat stabilised under conditions similar to those used for bonding the conjugate fibres, and, preferably, are also compatibly bondable with the conjugate fibres.

The crimp of potentially crimpable conjugate fibres may be developed before the batt is prepared. Thus the uncrimped conjugate fibres may be carded and formed into a batt by cross-layering and the batt heated to a temperature sufficient to develop the crimp of the fibres but not sufficiently high to effect inter-fibre bonding. The batt is then recarded before being subjected to an upward flow of hot fluid to bond the fibres. However, the recarding is not essential since the upward flow of gas tends to keep the batt open during crimp development.

Normally the fibres may have a decitex within a wide range, for example 1 to 50 decitex. Conveniently, fibres having a decitex in the range 5 to 30 are employed. The process is particularly useful for producing non-woven fibrous products of low density from fibres having a low decitex.

The density of the batt prior to bonding according to the present invention is conveniently the natural carded density, i.e. that normally produced by the carding machine, and which, though variable, is usually of the order of 0.005 gm/cm$^3$. If desired, of course, the density may be varied to suit the density required of the final product. The batt may be built up to varying thicknesses, if desired, by utilising a cross-lapping machine.

Inter-fibre bonding is effected by passing the batt through an oven in which a heated fluid is blown upwards through the batt, for example, through a fluidized bed of ballotini which evens out the air flow and acts as a heat exchanger. The velocity of the fluid should be sufficient to support the batt during its passage through the oven, and to prevent compacting of the fibres, but not sufficient to break the batt. Disintegration of the batt by the use of very high velocities may be reduced by imposing above the batt a foraminous surface and against which the batt is blown. The fluid may be any inert gas, such as, for example, air, or it may be admixed with or comprised solely of a plasticizing agent, for example steam in the case of nylon fibres. Before cooling, the bonded fibrous batt may optionally be compressed to a desired shape, for example, by compressing the batt between heated, shaped platens, or to a required density, for example, by passing it through a pair of rollers. Excessive compression is to be avoided in order to produce a product having a low density, high porosity, open "sponge-like" structure, and not a high density, "felt-like" structure.

An advantage of the process of the present invention is that it is possible to obtain a resilient, thermally bonded, non-woven, fibrous batt comprising at least 20% by weight of crimped conjugate fibres, the fibrous batt having a substantially uniform density across its thickness. The process is particularly useful for producing bonded batts having a substantially uniform density across its thickness from carded batts having a thickness greater than 1.5 cms and especially greater than 4 cms. The process may be used for bonding carded batts having a thickness of 20 cms. or even greater.

The process of the present invention is also useful for producing shaped articles having a minimum thickness of at least 1.5 cm., the carded batt being thermally bonded by the upward passage of the heating fluid, and then compressed to the desired shape. In the resulting product the ratio of number of bonds per unit volume to the density of the unit volume is substantially constant throughout the entire product. By contrast, shaping of the unbonded batt by compression followed by the passage of hot fluid causes tracking of the fluid which results in uneven thermal bonding.

The products of the invention may be utilized in the production of pillows, mattresses, and upholstery, for example.

The invention will be further described by way of example with reference to the following examples.

EXAMPLE 1

A 12 decitex per filament conjugate staple fibre having a length of 2 inches and a crimp level of 3 crimps per extended cm. was prepared. The fibre was of the sheath/core (1:2) type in which the core was polyethylene terephthalate and the sheath polyethylene terephthalate-isophthalate (80:20 mole %). The crimp was produced by stuffer-box crimping.

The staple fibre was fully opened by one passage through a carding machine and was built up into a batt having a thickness of 5 cms. using a lap wheel. Three layers were placed on top of each other, and the combined layers were heated in an oven in which air at a temperature of 210° C. and at a flow rate of 15 cfm was passed through a fluidized bed of ballotini (which acted as a heated exchanger) and upwards through the non-woven web. The velocity of the air was sufficient to prevent the fibres from compacting without displacing the fibres.

After cooling, a 13 cm. cube was cut out of the resulting non-woven, fibrous batt and each side subjected to a compression load of 5 kg. The vertical direction, as made, compressed 30% while at right angles, i.e. horizontal directions, the compression was only 4%. The product had a density of 0.019 gm per cc.

EXAMPLE 2

Staple conjugate fibre (20 decitex per filament) having a length of 49 mm. and slight crimp was produced from equal proportions of nylon-66 and nylon-6 spun in a side-by-side configuration, and was fully opened by one passage through a Tatham (Regd. Trade Mark) carding machine. The thus obtained web was cross folded to form a lofty batt having a thickness of 150 mm. which was then subjected for 1.5 minutes to superheated steam having a temperature of 230° C. blown vertically upwards through the batt at a velocity of 30 feet per minute. The steaming caused the fibres to develop fully their crimp, and to bond to each other. Finally, the batt was compressed to a thickness of 60 mm., cooled to 180° C. in steam, and then to ambient temperature by an upward draught of air. The resulting non-woven fibrous structure had a thickness of 60 mm. and a density of 0.026 gm. per cc.

EXAMPLE 3

Core/sheath (67:33) conjugate filaments (12 dpf), the core comprising poly(ethylene terephthalate) and the sheath polypropylene, were stuffer box crimped (8 crimps per extended cm.), heat set, and cut to a staple length of 49 mm. The staple was fully opened by one passage through a Tatham (Regd. Trade Mark) carding machine and cross-folded to give a batt having a thickness of 60 mm. The batt was subjected for 1 minute to an up-draught of air having a temperature of 175° C. and a velocity of 50 feet per minute, by passing it through an up-flow air oven. This treatment caused the fibres to bond together. Afterwards the batt was compressed whilst hot to a thickness of 30 mm. and then cooled by an upward flow of air to give a structure having a density of 0.023 gm. per cc.

EXAMPLE 4

Side/side conjugate filaments (6 dpf) were spun from equal amounts of poly(ethylene terephthalate) and a copolymer of poly(ethylene terephthalate) containing 20 moles percent of poly(ethylene isophthalate), the filaments then being stuffer-box crimped (6 crimps per extended cm), heat set, and cut to a staple length of 50 mm. A mixture of this fibre with an equal weight of the staple core/sheath fibre of Example 3, was opened and blended using a Shirley (Regd. Trade Mark) miniature carding machine, and formed into a batt having a thickness of 120 mm. on a lap wheel. The batt was subjected for 1.5 minutes in an up-flow oven to an up-draught of air having a temperature of 215° C. and a velocity of 50 feet per minute. The resulting batt was compressed to a thickness of 70 mm and cooled to give a non-woven structure having a density of 0.03 gm. per cc.

EXAMPLES 5 AND 6, AND COMPARATIVE EXAMPLES A AND B

Staple fibre used in Example 2 was carded and formed into a batt having a thickness of 150 mm. The batt was divided into several aliquot portions. The samples were heated at different temperatures in an up flow oven, according to the present invention, or in a down flow oven according to the known processes of bonding. The air velocity in the up-flow oven was 50 feet per minute whereas that in the down flow oven was 500 feet per minute. The average density of each bonded sample was measured and then cut in a horizontal plane, the density of the upper and lower halves then being measured. Conditions of the experiments and the density of the products are given in table I below.

TABLE I

| | Type of Oven | Temp. of Air (°C.) | Density (gm. per cc) Average | Upper half | Lower half |
|---|---|---|---|---|---|
| Example 5 | Up flow | 207 | 0.010 | 0.010 | 0.010 |
| Example 6 | Up flow | 215 | 0.012 | 0.011 | 0.012 |
| Comparative Examples A | Down flow | 207 | 0.023 | 0.013 | 0.044 |
| B | Down flow | 215 | 0.037 | 0.017 | 0.063 |

The results given in the table clearly show that the non-woven structures of the present invention have a substantially uniform density throughout their thickness whereas the structures produced by known methods vary considerably in density.

EXAMPLES 7 TO 10

Conjugate staple fibres spun from equal proportions of nylon-66 and nylon-11, and having a decitex of 10 per filament, were converted into a lofty batt having a thickness of 50 mm. Portions of this batt were then subjected to an upward flow of air heated to a temperature of 185°-190° C., the velocity being varied.

TABLE II

| | Velocity of air (feet per min.) | Effect on loftiness of batt |
|---|---|---|
| Example 7 | 22 | Some reduction in thickness. |
| 8 | 61 | Very slight reduction in thickness |
| 9 | 79 | No change in thickness |
| 10 | 92 | Some fibers blown from surface. |

The results of the experiments, given in table II, show that the velocity of the updraught of the bonding fluid has some effect upon the resultant non-woven structure. The actual effect will depend upon the conditions employed, such as, the nature of the fibres, the weight and thickness of the unbonded batt, and the characteristics of the oven used.

What I claim is:

1. In a method for the production of a low-density, high porosity, resilient, thermally bonded, non-woven fibrous batt having a substantially uniform density across its thickness by the steps of forming a lofty fibrous batt from at least 20% by weight of conjugated staple fibres having a length of 0.5 to 6 inches and being selected from the group consisting of crimped and potentially crimpable fibres, the conjugate fibres being composed of at least two fibre forming polymeric components arranged in distinct zones across the cross-section of the fibre and substantially continuous along the length thereof, one of the components having a softening temperature significantly lower than the softening temperature of a second component and being located so as to form at least a portion of the peripheral surface of the fibre, subjecting said batt to a heat treatment to heat the batt to a temperature in excess of the softening temperature of the component having the lower softening temperature but below the softening temperature of the second component to effect inter-fibre bonding, and then causing [or permitting] the batt to cool, the improvement comprising heating the batt by passing a heated gas upwardly through the batt, the gas having a temperature sufficient to effect thermal bonding of the conjugate fibres and having a velocity such that the batt is supported by the gas in a high-porosity condition without disintegrating the batt therein *and causing the batt to cool by an upward passage of cooling air through the batt to quench the fibres and permit them to rapidly redevelop their modulus,* whereby the resulting batt has substantially uniform density across its thickness.

[2. A method for the production of a resilient, bonded, non-woven fibrous batt as in claim 1 including cooling the thermally bonded batt by an updraught of cold air.]

3. A method for the production of a resilient, bonded, non-woven fibrous batt as in claim 1 including compressing the thermally bonded batt before the cooling stage.

4. A method for the production of a resilient, bonded, non-woven fibrous batt as in claim 1 wherein the fibres have or are capable of developing a crimp frequency of less that 10 crimps per extended centimeter.

5. A method for the production of a resilient, bonded, non-woven fibrous batt as in claim 1 wherein the conjugate fibres have or are capable of developing a crimp frequency of less than 10 crimps per extended centimeter and a decitex in the range 5 to 30.

6. A method as in claim 1 wherein the upward stream of gas blows the batt against a foraminous surface disposed above the batt.

[7. An improved low density, high porosity, resilient, thermally bonded, non-woven fibrous batt having a substantially non-uniform density across its width, made by the process of claim 1.]

* * * * *